(12) United States Patent
Wang

(10) Patent No.: US 6,702,071 B2
(45) Date of Patent: Mar. 9, 2004

(54) ADJUSTER STRUT

(75) Inventor: Nui Wang, Croydon (AU)

(73) Assignee: PBR Australia Pty. Ltd. (AU)

( * ) Notice: Subject to any disclaimer, the term of this patent is extended or adjusted under 35 U.S.C. 154(b) by 0 days.

(21) Appl. No.: 10/216,050

(22) Filed: Aug. 9, 2002

(65) Prior Publication Data

US 2003/0070890 A1 Apr. 17, 2003

Related U.S. Application Data

(63) Continuation of application No. PCT/AU01/00101, filed on Feb. 6, 2001.

(30) Foreign Application Priority Data

Feb. 11, 2000  (AU) ................................................ PQ5583

(51) Int. Cl.[7] .......................... F16D 51/00; F16D 51/06
(52) U.S. Cl. ................................ 188/79.54; 188/79.64; 188/196 BA
(58) Field of Search ..................... 188/146 B, 146 BA, 188/146 P, 146 D, 79.51, 79.54, 79.55, 79.56, 79.62, 79.63, 79.64

(56) References Cited

U.S. PATENT DOCUMENTS

| | | | | |
|---|---|---|---|---|
| 3,719,258 A | * | 3/1973 | Margetts ................ | 188/196 BA |
| 4,079,819 A | * | 3/1978 | Shirai et al. .......... | 188/196 BA |
| 4,220,227 A | * | 9/1980 | Kluger ................. | 188/196 BA |
| 4,729,457 A | * | 3/1988 | Cousin et al. .......... | 188/79.54 |
| 5,029,676 A | * | 7/1991 | Yamamoto ................ | 188/79.54 |
| 5,720,367 A | * | 2/1998 | Evans ..................... | 188/79.64 |
| 6,082,505 A | * | 7/2000 | Asai et al. ............... | 188/79.54 |

FOREIGN PATENT DOCUMENTS

| AU | 278416 | 6/1966 |
|---|---|---|

OTHER PUBLICATIONS

Suzuki KK, "Drum brake for vehicle —has step part formed at lower surface of first connection part which supports second connection part with adjuster strut "*Derwent Abstract Accession No. 97–049697/05, Class Q63, JP 08303492A* (Suzuki KK) Nov. 19,1996, (Abstract), 1 page.

* cited by examiner

*Primary Examiner*—Matthew C. Graham
(74) *Attorney, Agent, or Firm*—Schwegman, Lundberg, Woessner & Kluth, P.A.

(57) ABSTRACT

An adjuster strut (10) for use in a drum brake assembly. The adjuster strut (10) has an adjustable elongate extent with first and second engagement means (17,37) disposed at opposite ends thereof for engaging opposed braking members (11, 12,35) of a brake assembly. The first engagement means (17) is arranged for receipt and support within an inwardly opening slot (19,20) formed in one of the braking members (11,12,35) and includes an end face (18) for abutting engagement with the inner end wall (19a,20a) of the slot opening (19,20). The first engagement means (17) further includes a first channel (21) extending rearwardly from the face (18), for receiving therein an edge or wall portion (hereinafter an "edge portion") defining the slot opening (19,20). The braking members can include opposed cross-sectionally T-shaped brake shoes and a parking brake lever disposed adjacent the inwardly extending web of one of the brake shoes.

27 Claims, 5 Drawing Sheets

ADJUSTER STRUT

RELATED APPLICATIONS

This application is a continuation under 35 U.S.C. 111(a) of International Application No. PCT/AU01/00101 filed Feb. 6, 2001 and published Aug. 16, 2001 as WO 01/59321 A1, which claimed priority to Australian Application No. PQ 5583 filed Feb. 11, 2000, which applications and publication are incorporated herein by reference.

FIELD OF THE INVENTION

The present invention relates to an adjuster strut for use in a drum brake assembly and to a drum brake assembly that employs an adjuster strut.

BACKGROUND OF THE INVENTION

Adjuster struts are commonly employed in brake assemblies to facilitate compensation for wear over time in brake friction lining. The adjuster strut typically extends in engagement between opposed braking members, being opposed brake shoes, or a brake shoe and a parking brake lever, and is operative to automatically extend lengthwise upon wear of the friction lining, to maintain a substantially constant gap between the lining and the drum braking surface in a "brake off" or non-braking condition.

Most known adjuster struts generally have bifurcated or forked ends suitable to accept at one end thereof the leading edge of the inwardly depending web of a T-shaped brake shoe, and at the other end thereof, both the leading edge of the inwardly depending web of an opposed, T-shaped brake shoe and the similar edge portion of the parking brake lever positioned adjacent thereto. At least one portion of such a strut is normally formed from tubular metal and the bifurcated end of the strut is typically formed by pressing the end of the tubular portion together and removing a central portion therefrom to form a lengthwise slot. That slot is generally of a width approximately equal to, but slightly greater than the thickness of the sections or portions of the braking member or members which it is to accept. It is also normal for both the webs and the parking brake lever to be formed with slot openings at the desired strut engagement position to accept and support the ends of the strut.

One drawback of the above known strut arrangement is that the material removed from the pressed tubular end portion is wasted and the mechanism of removal, normally by grinding or stamping, requires a specific manufacturing step. Moreover, such struts can be awkward to install, given that the bifurcated ends are required to straddle the respective web and lever edges.

A further drawback of known adjuster struts is the manner in which the ends thereof are connected or supported in the brake assembly. In some prior art arrangements, the ends of the adjuster strut have a significant lengthwise bifurcation to such an extent to ensure that the adjuster strut remains engaged at either end with the braking members on radial expansion of the brake shoes, even if the strut malfunctions so as not to extend itself during that expansion. This arrangement prevents release of one or both ends of the adjuster strut from engagement with the relevant braking members, as such release is undesirable, by leaving the strut unsecured within the rotating wheel cavity and permitting the strut to possibly damage the components in that cavity or jam the brake assembly against operation, with obvious and potentially catastrophic consequences.

An alternative prior art arrangement adopted in this respect employs biasing springs to permanently secure the ends of the adjuster strut in engagement with the braking members. Such adjuster struts generally employ an adjuster mechanism that includes a nut threaded on a shaft and rotation of the nut by the adjuster mechanism permanently shifts the axial position of the shaft to lengthen the adjuster strut. The major length of the shaft is accommodated within an unthreaded tube so that the shaft can rotate freely within the tube and shift axially without obstruction. In the case of malfunction/seizure of the adjuster mechanism, expanding movement of the brake shoes can be accommodated as necessary through lengthwise expansion of the adjuster strut, by sliding movement of the shaft within the tube while the ends of the strut are secured to the braking members by the springs. This arrangement therefore secures the strut against release from the braking members, but requires additional spring components and can be awkward to fit.

SUMMARY OF THE INVENTION

It is an object of the present invention to provide an adjuster strut that overcomes or at least alleviates one or more of the above drawbacks.

According to the invention there is provided an adjuster strut for use in a drum brake assembly, said adjuster strut having an adjustable elongate extent with first and second engagement means (units) disposed at opposite ends thereof for engaging opposed braking members of a brake assembly, said first engagement means being arranged for receipt and support within an inwardly opening slot formed in one of said braking members and including an end face for abutting engagement with the inner end wall of said slot opening, said first engagement means further including a first channel extending rearwardly from said face, for receiving therein an edge or wall portion (hereinafter an "edge portion") defined by said slot opening.

An adjuster strut of the above kind is distinguished from the prior art by the absence of the need for each end of the strut to be bifurcated. As such, there are reduced levels of wasted material in the strut construction. In particular, the strut can have reduced axial length, because at least one of the ends of the strut does not have to accept the radially inward extending edge of one or both of the braking members. Additionally, the channel formed in the adjuster strut of the invention can be formed as part of the pressing step normally already undertaken in the formation of one of the ends of known struts. Thus, an adjuster strut according to the invention can have less manufacturing steps compared to known struts.

An adjuster strut according to the present invention preferably includes a main portion which is formed from tubular metal section and the end portion for engagement within the slot opening of the braking member is preferably pressed to flatten the end and to form the channel between upstanding side regions to accept the edge portion of the slot opening. Receipt of the edge portion within the channel is such as to locate the respective end of the adjuster strut in at least one plane relative to the braking member to which it is engaged. A second channel may be formed on an opposite side of the channel described above so that the end has a cross-section which his generally dumb-bell shaped, and that second channel is provided to accept a second and oppositely disposed edge portion of the slot opening so that the adjuster strut is engaged by edges of the slot opening on opposite sides thereof.

A slot opening is provided in at least one of the braking members for receipt and support of one end of the adjuster strut, although in a preferred arrangement, each braking member includes a slot opening so that each end of the strut is received and supported in such a slot. In that arrangement, the end face of the or each strut end is preferably arranged for abutting engagement with the inner end of a slot opening at least in the brake off condition of the brake assembly, while the upper and/or the lower edge portions of that opening is/are received in a channel(s) extending rearwardly from the end face.

The invention further provides a drum brake assembly including a rotatable drum, a support, a pair of cross-sectionally T-shaped brake shoes defining a radially inwardly depending web mounted on said support in opposed relationship for substantially radial movement into and out of engagement with a braking surface of said rotatable drum, actuating means facilitating movement of said brake shoes, and an adjuster strut, said adjuster strut having an adjustable elongate extent with first and second engagement means disposed at opposite ends thereof for respectively engaging said brake shoes, said first engagement means being received and supported within an inwardly opening slot formed in the web of a first of said brake shoes and including an end face for abutting engagement at least in a radially contracted or brake off condition of said brake shoes with the inner end wall of said slot opening, said first engagement means further including a first channel extending rearwardly from said face and said slot being arranged so that an edge or wall portion (hereinafter an "edge portion") of said slot opening extends into said channel.

The invention still further provides a drum brake assembly including a rotatable drum, a support, a pair of cross-sectionally T-shaped brake shoes defining a radially inwardly depending web mounted on said support in opposed relationship for substantially radial movement into and out of engagement with a braking surface of said rotatable drum, a parking brake lever disposed adjacent the web of one of said brake shoes, actuating means facilitating movement of said brake shoes, and an adjuster strut having an adjustable elongate extent with first and second engagement means disposed at opposite ends thereof, said first engagement means engaging said brake shoe and said adjacent parking brake lever, and said second engagement means engaging the other said brake shoe, said first engagement means being received and supported within adjacent inwardly opening slots formed in each of the web of the first of said brake shoes and said parking brake lever, and including an end face for abutting engagement at least in a radially contracted or brake off condition of said brake shoes with the inner end wall of at least one of said adjacent slots, said first engagement means further including a first channel extending rearwardly from said face and an edge or wall portion (hereinafter an "edge portion") of at least one of said adjacent slots extending into said channel.

In a brake assembly in which a slot opening is formed in both the brake shoe web and the adjacent parking brake lever, the respective openings may be of different lengthwise extent, preferably with the slot opening of the brake shoe web having greater lengthwise extent than that of the parking brake lever. This arrangement is such that the relevant end face of the strut engages only the inner end of the slot opening in the parking brake lever during normal operation. This arrangement facilitates disassembly of the brake assembly to remove a drum that has developed a lip or step through wear in a manner which is described later.

The above arrangement secures the strut end against movement laterally to the plane of the shoe web or parking brake lever in which the slot opening is formed in both the brake on and brake off conditions. The arrangement also permits movement in the lengthwise direction of the strut, such that in the brakes on condition, when the brake shoes of the brake assembly and the parking brake lever shift radially outwardly, the or each end face of the strut and the inner end of the or each slot, can shift away from abutting engagement as required, but the channel engagement remains. Accordingly, despite any lengthwise movement of the strut, the ends of the strut remain engaged in the slots with the respective braking members. In accordance with its normal function, upon wear of the brake shoe friction lining, the adjuster strut extends lengthwise to compensate for that wear, although the mechanism by which the strut is extended can take any suitable form and is not restrictive on the present invention.

Preferably, the, or one of the end faces of the adjuster strut engages the inner end of a slot opening formed in a parking brake lever associated with a brake shoe. In such an arrangement, it is common for the body of the lever to be formed out of metal plate and to be positioned adjacent and generally in side-by-side sliding contact with the inwardly depending web of a T-shaped brake shoe with which it is associated. In that arrangement, given the close proximity of the lever to the shoe web, it is appropriate for both the parking brake lever and the brake shoe web to have slot openings for receipt of an end of the adjuster strut. In this arrangement, and as described earlier, the slots may have different elongate extents, such that the end face of the adjuster strut engages the inner end of the slot formed in the parking brake lever only.

During operation of the brake assembly to a brake on condition, the strut may undergo slight pivoting movement and therefore the slot openings in the braking members are preferably shaped to permit that pivoting movement. In one arrangement, the edges of the slot opening in the parking lever taper from the inner end to be wider at the mouth thereof, while the slot opening of the shoe web is shaped wide at the inner closed end thereof and converges toward the open mouth thereof. By this arrangement the adjuster strut may pivot as necessary without obstruction from either of the upper and lower edge portions of the slot opening in the brake shoe web, but the edge portions of the web slot opening can be arranged at the most convergent point to engage or be closely adjacent upper and lower surfaces of the respective strut end, to substantially eliminate vertical movement of that end, particularly if the end shifts in the lengthwise direction of the strut away from abutting engagement with the inner end wall of the parking brake lever to a position where the tapered edges of the slot in the parking lever are spaced further apart, so itself providing limited resistance to vertical movement.

In one preferred arrangement, the channel of the strut end portion has a width sufficient to accommodate only the edge portions of the slot opening of the parking brake lever. The side walls of the channel may extend closely adjacent the opposite sides of the edge portion to capture it in the channel against relative lateral or sideways movement. By this arrangement, the strut end section can conveniently be substantially restrained against undesirable movement both parallel and perpendicular to the plane of the shoe web.

In a second aspect of the invention, a biasing arrangement is employed for biasing the parking brake lever of a brake assembly toward the inwardly depending web of a T-shaped brake shoe. This aspect of the invention provides for engagement of an end of the adjuster strut in a slot opening of the parking brake lever and is characterised by the provision of biasing means extending between the adjuster strut and the brake shoe web which biases the parking brake lever and the brake shoe web towards each other and preferably together.

In one preferred arrangement of this second aspect of the invention, the biasing means includes a cantilever spring bias that has attachment means for attachment to the adjuster strut and that extends into engagement with a side surface of the brake shoe web to bias the web toward the parking brake lever. The attachment means may conveniently be a clip arrangement and in respect of an adjuster strut having a cylindrical body portion between respective opposite end portions, the clip arrangement may clip onto that cylindrical portion. The clip engagement may be sufficient to position the biasing means on the adjuster strut, although additional locating means such as to position the strut both angularly and longitudinally, may be provided for that purpose.

The attachment means may equally take other forms and the biasing means may for example, be attached to the adjuster strut by suitable fastening means, or such as by permanent welding attachment or riveting.

In the above arrangement the biasing means biases the brake shoe web toward and preferably into engagement with the parking brake lever in one direction only, being laterally to the elongate extent of the adjuster strut and to the plane of the web, and in that arrangement, a moment force will be generated tending to rotate the brake shoe relative to the strut. Thus, in an alternative arrangement, the biasing means imposes an equal and opposite biasing force so that no such moment force is created. In this arrangement, a pair of cantilever springs can extend into contact respectively with oppositely facing side surfaces of the brake shoe web or respective oppositely facing side surfaces of the brake shoe web and the parking brake lever. Both cantilever springs impose an equal and opposite force tending to bias the web and lever into engagement.

In a third aspect of the invention, an adjuster strut is provided with means to secure it to the braking member with which it is engaged to prevent release of the strut from its operative position. This third aspect of the present invention is characterised in that one end of the adjuster strut is formed to cooperate directly with one of the braking members so that that end of the strut is secured against release from the braking member in the assembled or operative position of the strut. In one preferred form of this aspect of the invention, the end of the adjuster strut includes abutment means suitable for engagement in the operative position of the strut to engage an abutment formed or provided on the braking member, whereby that cooperation secures the end of the adjuster strut against release from the braking member.

The abutment means can take any suitable form and in one form, it is formed by an elongate member which extends from the strut into engagement behind the braking member abutment in the operative condition of the strut. That member may for example, be of plate metal form which is fixed to the strut in any suitable manner and which has a distal end formed for positioning behind the abutment. An alternative form of this aspect of the invention includes a member that extends from the strut and engages in an opening provided in the braking member. In a preferred arrangement the opening is provided in the radially inwardly depending web of a T-shaped brake shoe and the strut member includes an abutment arranged to abut against a radially inward edge of the opening to resist release of the strut from its operative position as assembled between the braking members. The abutment may not engage the edge at all times and in a preferred arrangement, engagement only occurs when the brake assembly is in a brake on condition, or when the adjuster has failed and has stopped adjusting or extending. Thus, the opening preferably is shaped to allow movement of the abutment toward and away form the edge of the opening as the brake assembly shifts between brake on and brake off conditions.

In another form of this aspect of the invention, the end of the adjuster strut is formed to have a head and a neck portion and a substantially radial stepped surface extends at the junction between the head and the neck. In one form of this arrangement, both the head and the neck are generally cylindrical and the stepped surface is formed by an increase in the diameter from the neck to the head. The abutment formed by the braking member for cooperation with this form of strut end can be formed as part of the slot opening which is formed to receive the end of the adjuster strut. Conveniently, the abutment may be formed at the open end of the slot opening and may for example, depend downwardly from the upper edge thereof, forming a lip or catch. More than one abutment, of this kind or otherwise, may be provided.

The example forms of abutment means described above advantageously can be applied to opposite ends of the adjuster strut. Alternatively, they may be employed separately with other forms of strut ends applied to the opposite end of the strut.

The above arrangements are preferably such as to permit simple installation of the abutment means relative to the abutment to secure the adjuster strut in the place. However, in such an arrangements, it is preferable that means be provided to ensure the integrity of the arrangement during operation of the brake assembly, such as to prevent lateral disengagement of the abutment means from the shoe web abutment. Biasing means as described for the second aspect of the invention could, for example, be employed to prevent lateral disengagement of the stepped surface from the abutment, although in a preferred arrangement, the head may be bifurcated to engage opposite side surfaces of the braking member. In this arrangement, installation of the adjuster strut may be by angled insertion of the bifurcated head into the slot opening and onto the inner end thereof, followed by rotation of the strut into the general plane of the opposite brake member edge or web, whereby the abutment means, such as the stepped surface is brought into alignment behind the brake member abutment.

Each of the above described strut end forms can be employed in a single adjuster strut. That is, the strut end having an end face and a rearwardly depending channel of the first aspect of the invention can be employed in a strut in which the opposite end is formed according to the third aspect. Additionally, the method of angled insertion of the adjuster strut can be employed in a strut that has both described end forms. This is particularly the case in an adjuster strut that employs an end face of the first aspect, as that end face is not bifurcated and as such, is not required to straddle opposite sides of the braking member. As such, that end form does not have to be installed end on to the web or lever portion it is to engage, but can be rotated or swivelled into position. Moreover, biasing means as may be required, can be fitted subsequently. The third aspect of the invention is preferably applied between the end of the adjuster strut and the brake shoe web, although it could also be applied, but less preferably, to the parking brake lever.

BRIEF DESCRIPTION OF THE DRAWINGS

The attached drawings show an example embodiment of the invention of the foregoing kind. The particularity of those drawings and the associated description does not supersede the generality of the preceding broad description of the invention.

DETAILED DESCRIPTION

Figure 1:
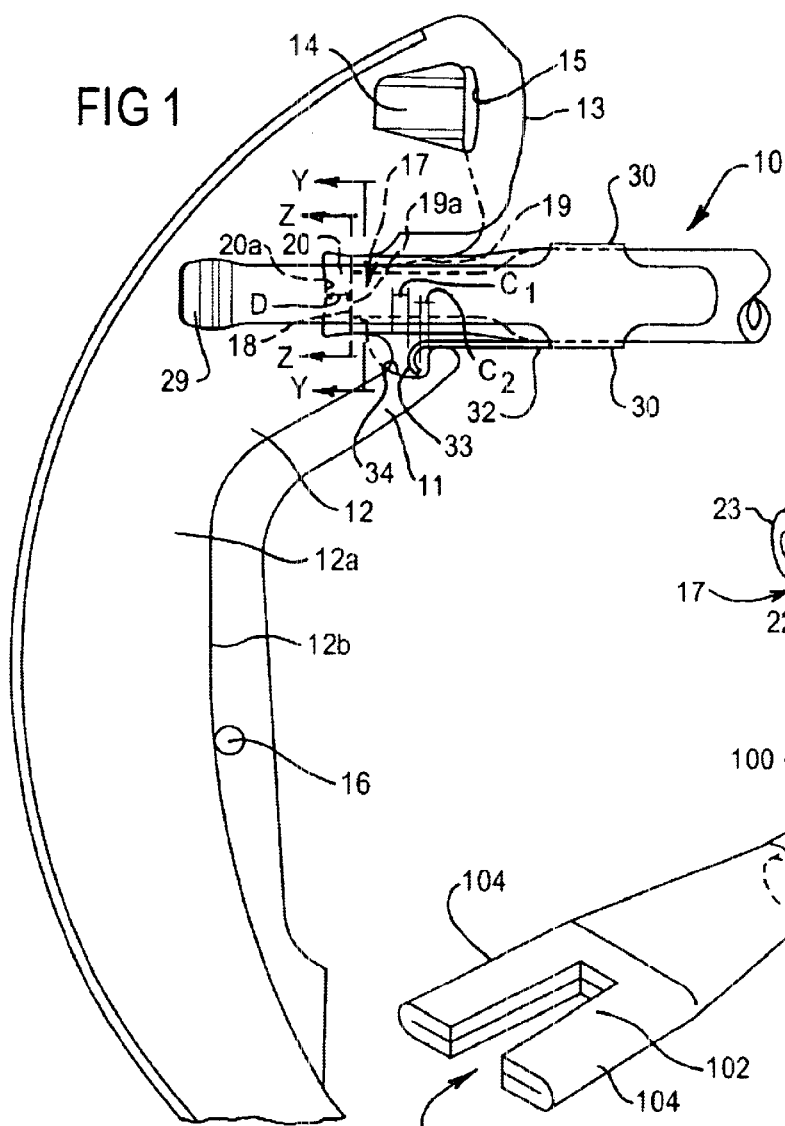
FIG. 1 shows a partial view of a brake assembly according to one embodiment of the invention.

FIG. 1 shows one end of an adjuster strut 10, which embodies aspects of the present invention. As shown, the strut 10 is in operative engagement with a parking brake lever 11 and a brake shoe 12 with which the lever 11 is associated in side-by-side sliding engagement. Each of the lever 11 and the shoe 12 are shown only in partial view, but in general terms, the shape and operation of these components is in accordance with prior art arrangements. The brake shoe 12 for example, is of T-shaped cross-section and includes a radially inwardly depending web 12a and an abutment surface 13 against which a hydraulic piston actuator acts to radially shift the shoe 12 to apply a braking force to a drum braking surface. Additionally, the lever 11 and shoe 12 are coupled together by a projection 14 of the lever 11 extending through an opening 15 in the web 12a, while the lever 11 includes a projection 16 that engages the inner edge 12b of the web 12a to locate the lever 11 relative to the shoe 12 in a non-operative condition.

Figure 2:
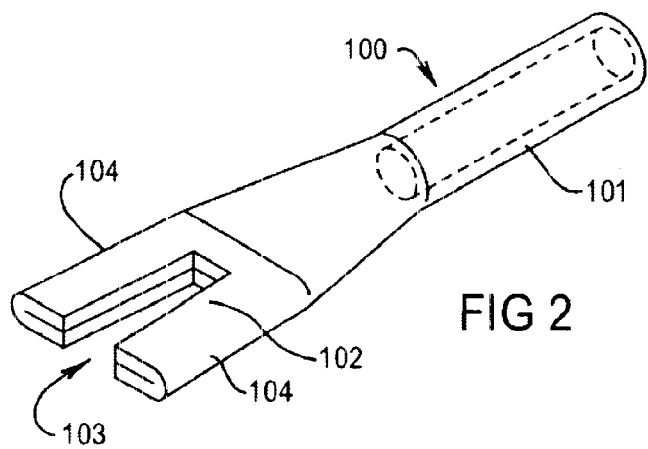
FIG. 2 shows a partial end view of a prior art adjuster strut.

The strut 10 is of elongate form and is lengthwise adjustable by any suitable arrangement. The strut 10 as shown, cooperates with both the lever 11 and the shoe 12 in a unique manner which is considered to be superior when compared to the arrangements employed in the prior art struts. As an example of such prior art struts, FIG. 2 shows one end of a strut 100, which has been formed by pressing a tubular section 101. The end 102, by the pressing operation, is generally flat and by a grinding or stamping operation, recess 103 is formed between the legs 104. The end 102 is therefore forked or bifurcated.

Figure 3:
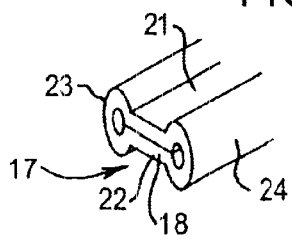
FIG. 3 shows a partial one end view of an adjuster strut according to one embodiment of the invention.

The strut 10 does not require a bifurcated end 102 and therefore does not require removal of material as occurs from the pressed end 102. Instead, the end 17 of the strut 10 is shown in FIG. 3 (in exaggerated form) and that figure shows a straight or flat end face 18. Moreover, the strut 10 can be reduced length compared to the strut 100, because the strut 10 does not require the legs 104.

Figure 1A:
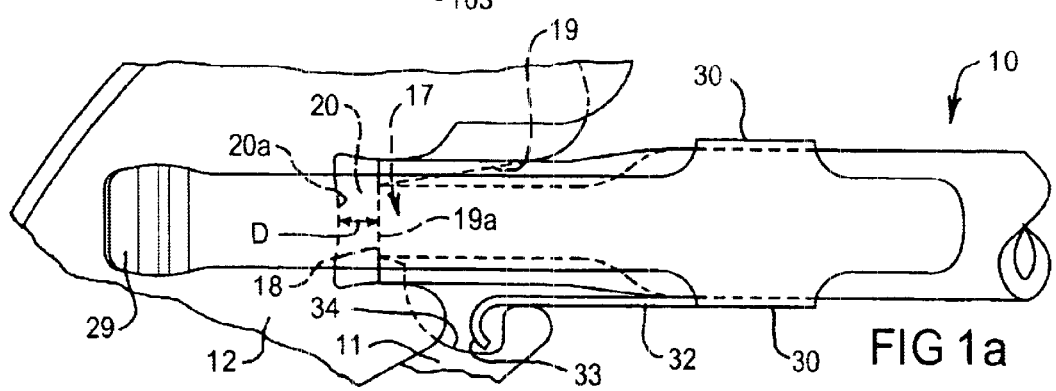
FIG. 1a is an enlarged, partial view of FIG. 1.

Each of the lever 11 and the shoe 12 include a slot opening 19 and 20 respectively. This arrangement is more clearly shown in FIG. 1a. The slot opening 20 has a greater lengthwise extent than the slot opening 19 such that the inner end 20a of the opening 20 is spaced from the inner end 19a of the opening 19 a distance D. As such, the strut end face 18 is in abutting engagement with the inner end 19a of the lever 11 in the brake off or home position shown in FIG. 1. In this arrangement, the opposite end of the strut 10, which is not shown in FIG. 1, is in abutting engagement with the inner end of a slot opening formed in the inwardly depending web of the opposite T-shaped brake shoe.

The dimension D is provided to facilitate inward movement of the shoe 12 when the lever 11 is pushed away from the web 12a to disengage the projection 16 from the inner edge 12b. By that disengagement, the brake shoe can be moved inwardly the distance D and that permits a "lipped" drum (a drum that has worn through contact with the friction lining to produce a lip on the braking surface) to be removed from the brake assembly.

Figure 4:
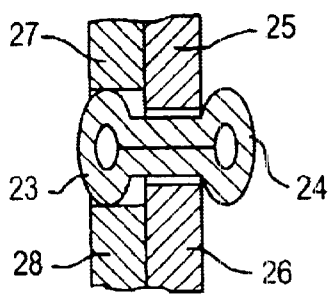
FIG. 4 is a cross-sectional view through section Y—Y of FIG. 1.
Figure 5:
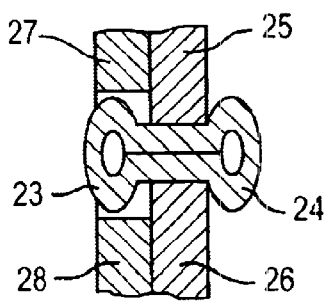
FIG. 5 is a cross-sectional view through section Z—Z of FIG. 1.

The strut 10 is formed at least in part from a tubular section (see FIG. 1). The end 17 of the strut 10 is pressed together into a generally flattened form as shown in FIGS. 3 to 5. As shown in these figures, the pressed end 17 is formed to have a pair of oppositely facing channels 21, 22 defined by side walls 23, 24. As shown in FIGS. 4 and 5, the channels 21, 22 have a width sufficient to accommodate the upper and lower edge portions 25, 26 of the slot opening 19 of the lever 11 only. The channels 21, 22 do not accommodate the upper and lower edge portions 27, 28 of the slot opening 20 of the shoe 12. Thus, the strut end 17 is trapped against movement laterally to the plane of the lever 11 by accommodation of the edge portions 25, 26 within the channels 21, 22. It is preferred for ease of assembly that the channels 21, 22 only accommodate the wall portions 25, 26, so that the strut end 17 only engages the lever 11 by way of engagement with the channels 21, 22 and not the shoe web 12a.

The arrangement shown in FIGS. 1, 4 and 5 advantageously minimises movement of the strut end 17, by the particular shape and arrangement of the slot openings 19 and 20 which engage the end at each of two separate and spaced positions. Section YY shown in FIG. 4 shows the edge portions 27, 28 of the web 12a respectively in engagement with the upper and lower faces of the side wall 23, while the edge portions 25 and 26 of the lever 11 are respectively slightly spaced from the base of the channels 21 and 22. The respective engagement between the edge portions 27, 28 and the side wall 23 resists movement of the strut end 17, at least in the plane of the web 12a. To further ensure restriction of strut movement, section ZZ shows the edge portions 25, 26 respectively engaging the base of the channels 21, 22 while the edge portions 27, 28 are respectively slightly spaced from the upper and lower faces of the side wall 23. Thus, by this arrangement, movement of the strut in the plane of the web 12a is restrained by engagement with the edge portions of each of the slot openings 19, 20 at separate locations, although that engagement permits some strut movement as may be required during brake actuation, such as limited pivoting movement.

The strut 10 can be installed at the end shown in FIG. 1 by positioning the end 17 in the slot opening 19 of the lever 11 before the lever 11 is moved into position adjacent the web 12 where projection 16 engages the inner edge 12b. The lever 11 may thereafter be brought into the operative position adjacent the web 12.

The assembly shown in FIG. 1 further includes biasing means (unit) to bias the lever 11 and the shoe 12 together. The biasing means includes a spring 29, which is more clearly shown in FIG. 6. Referring to that figure, the spring 29 is of cantilever form and includes attachment means in the form of clip attachment arms 30. The attachment arms 30 are resiliently flexible to fit about the outside of the strut 10 and to hold the spring 29 in position thereagainst. The spring 29 is held against rotation by engagement of the spring end 31 against the shoe web 12a.

The assembly shown in FIG. 1 further includes anchoring means (unit) for anchoring the strut 10 to the lever 11. The anchoring means could alternatively anchor the strut to the shoe web 12a and therefore it is not limited to the particular arrangement shown in FIG. 1. The anchoring means includes a member 32 that extends from the spring 29, preferably being formed integrally therewith, and the distal end of the member 32 is formed as a hook 33 for receipt within a recess 34. Cooperation between the hook 33 and the recess 34 is such as to restrain the strut end 17 against movement in the lengthwise direction of the strut 10 relative to the lever 11 that would cause separation of the strut end 17 from the slot openings 19, 20. Such separating movement can occur when the brake friction lining has worn a significant amount and the adjusting mechanism of the strut has failed providing no, or insufficient corresponding lengthwise extension of the strut 10, such that upon radial expansion of the brake shoe, the strut end 17 would, without the provision of suitable anchoring means, be released from the slot openings and become loose within the brake assembly. This could also occur upon expansion of the brake drum due to high brake temperatures, such that the brake shoes have greater travel to engage the drum braking surface.

The arrangement of FIG. 1 advantageously permits the brake shoes to expand either by hydraulic actuation or by the parking brake lever without restriction from the anchoring means by providing the clearance $C_1$ and $C_2$ as shown. The clearance $C_1$ permits actuating movement of the parking brake lever 11, while the clearance $C_2$ permits clockwise rotation of the lever 11 when the projection 16 is disengaged from the edge 12b of the shoe web 12, for drum release as described earlier, or to disengage the strut end 17 from the lever 11. Engagement of the hook 33 in the recess 34 may cause relative movement between the lever 11 and the shoe 12 during brake actuation, but that is acceptable and does not restrain the brake shoe from engaging the drum braking surface.

Figure 6:
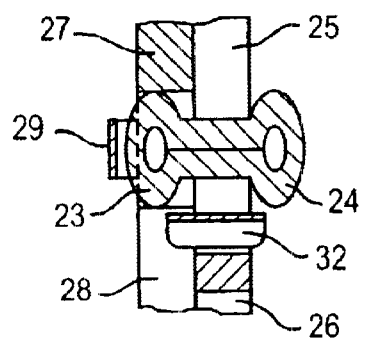
FIG. 6 shows a partial view of a further embodiment of the invention.
Figure 7:
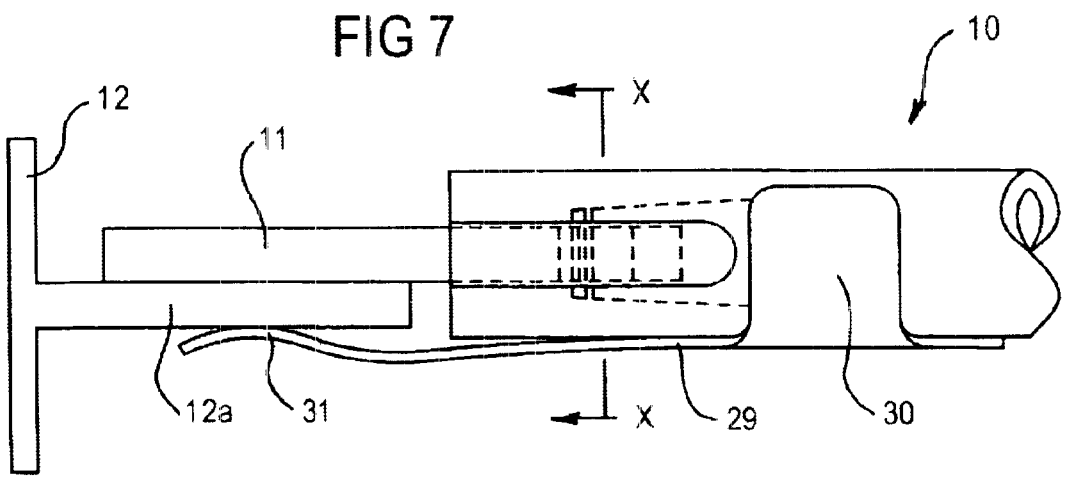
FIG. 7 is a cross-sectional view through section X—X of FIG. 6.

FIG. 7 is a cross-sectional view through section XX of FIG. 6. This view shows each of the features of FIGS. 1 and 6.

Figure 8:
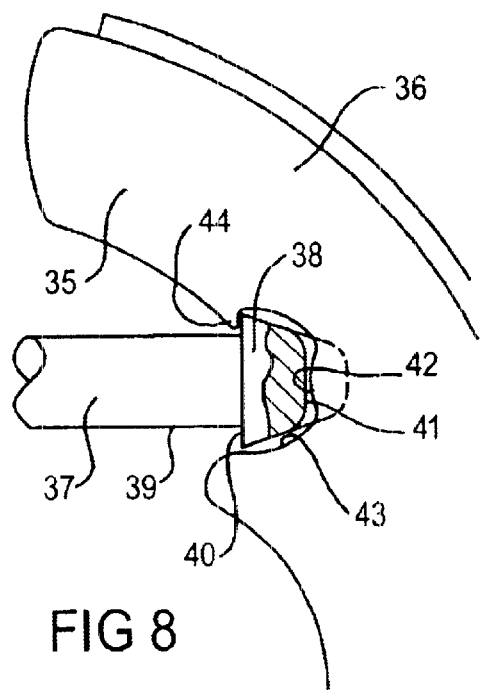
FIG. 8 shows a partial view of a brake assembly according to a further embodiment of the invention.

FIG. 8 shows the opposite end of the strut 10 in an operative position in engagement with the web 35 of a T-shaped brake shoe 36 positioned opposite the brake shoe 12. The strut end 37 is formed to have a head 38 and a neck 39, with a stepped surface 40 extending therebetween. Both the head 38 and the neck 39 are generally cylindrical and the arrangement is such that head, or the head and neck could be formed as a separate component and be fixed, such as by threaded connection to the strut end 37.

Figure 9:
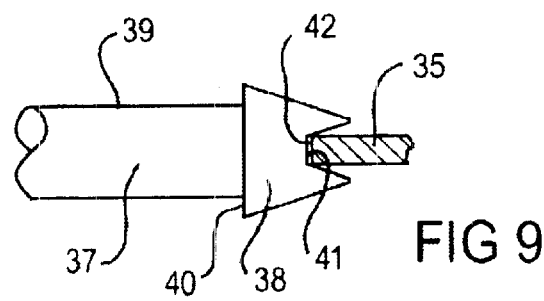
FIG. 9 is a partial end view of the adjuster strut of the assembly shown in FIG. 8.

The head 38 is bifurcated to define a channel 41 (see also FIG. 9) for receipt of the inner end 42 of a slot opening 43 in the web 35. Conveniently, the slot opening 43 is formed with a lip 44 that, in the operative position of the strut 10, cooperates with the stepped surface 40 to prevent release of the head 38 from the slot opening 43. By this arrangement and with reference to FIGS. 8 and 9, the strut end 37 is therefore restrained against axial and lateral movement relative to the axis of the strut 10. The arrangement does however permit slight pivoting movement, which the head 38 may undergo during brake actuation.

Figure 10:
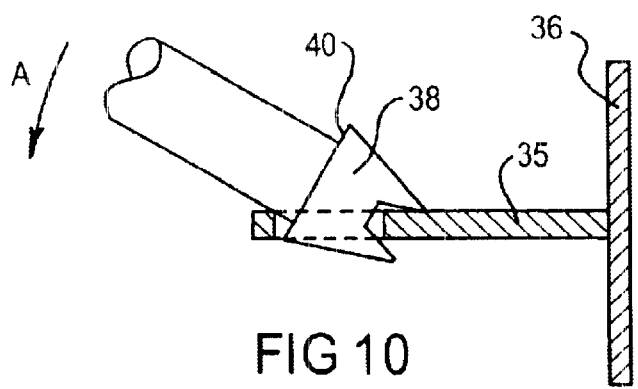
FIG. 10 shows a method of installation of the adjuster strut of FIG. 8.

An adjuster strut of the above form can conveniently be fitted in the brake assembly after the shoes have been fitted to the backing plate. FIG. 10 shows the method of fitting, which involves introducing the head 38 at an angle to the web 35 and thereafter swinging it in the direction A to the operative position. This angular introduction is necessary to permit the lip 44 to be located behind the head 38. Angular insertion advantageously is facilitated by adoption of an opposite strut end of the kind shown in FIGS. 1 and 3 to 7. Such a strut end is not bifurcated and therefore can be swung and slid into the operative position for engagement in the slot openings 19 and 20 as discussed earlier. However, it must nevertheless be appreciated that the FIGS. 8 to 10 arrangement can be employed separately from the FIGS. 1 and 3 to 7 arrangements in an alternative type of adjuster strut.

Figure 11:
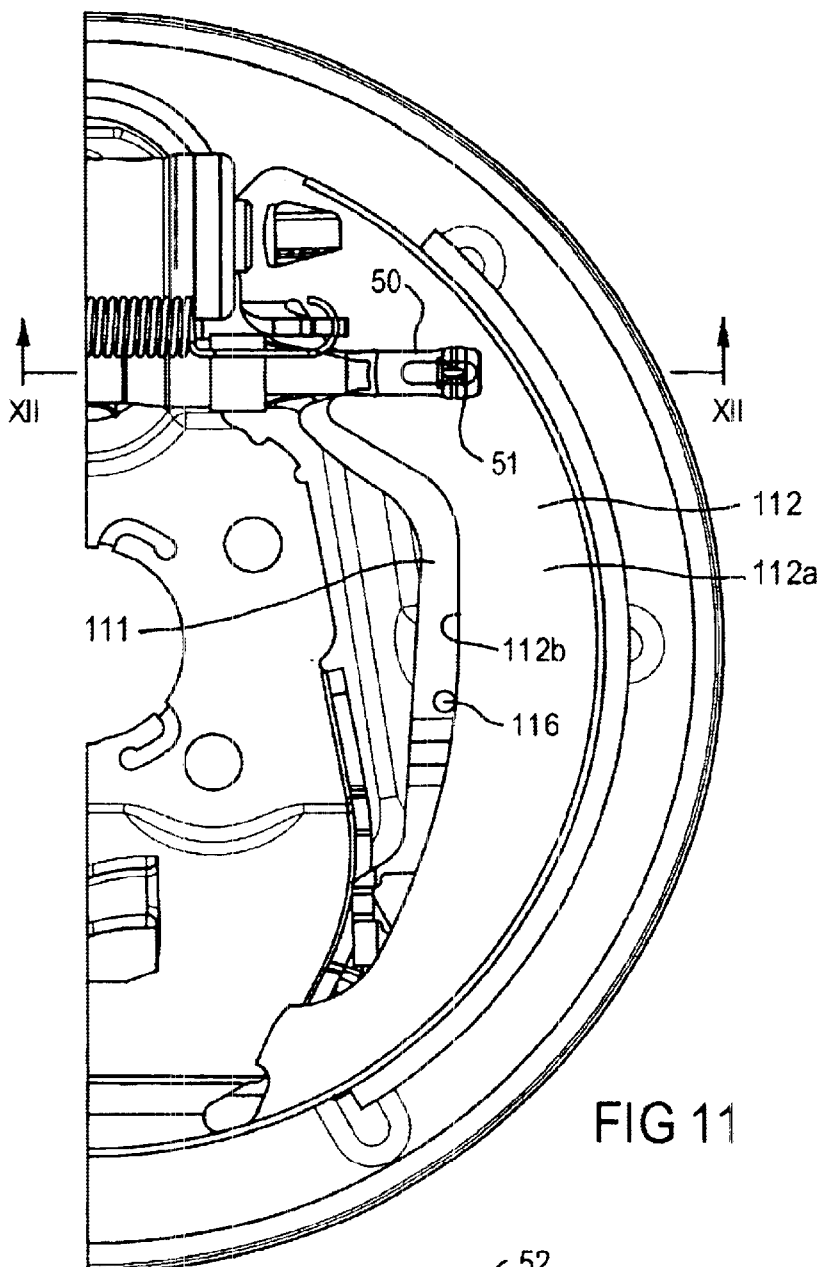
FIG. 11 shows a partial view of a brake assembly according to still a further embodiment invention.

An alternative form of anchoring means (unit) is shown in FIGS. 11 to 14. This anchoring means can be applied to an adjuster strut such as that shown in the preceding figures and therefore, the other aspects of the adjuster strut will not be described. Referring to FIG. 11, this shows anchoring means including a member 50 in partial view which includes an abutment 51. A T-shaped brake shoe 52 is shown in cross section which includes an opening 53. A parking lever 54 is also shown in cross section along with one end 55 of an adjuster strut.

As shown in FIG. 11, the abutment 51 is in engagement with a radially inward edge 56 of the opening 53. The other end of the member 50 is attached to the strut body, such as in a like manner to that shown in FIG. 1, so that in the engaged condition of the abutment 51 with the inward edge 56, the strut is prevented from shifting further away from the brake shoe 52. The arrangement of FIG. 11 provides the same anchoring effect as the equivalent arrangement shown in FIG. 1, but the FIG. 11 arrangement operates in a plane disposed perpendicular to the FIG. 1 arrangement.

Figure 12:
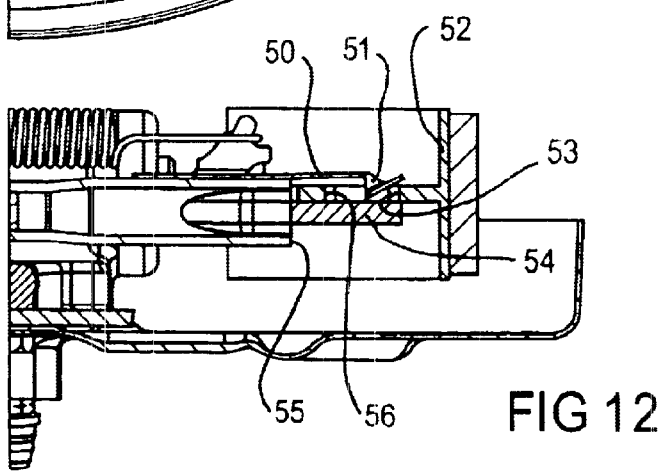
FIGS. 12, 13 and 14 respectively show a partial view of a brake assembly according to the invention during movement of the brake shoes.
Figure 13:
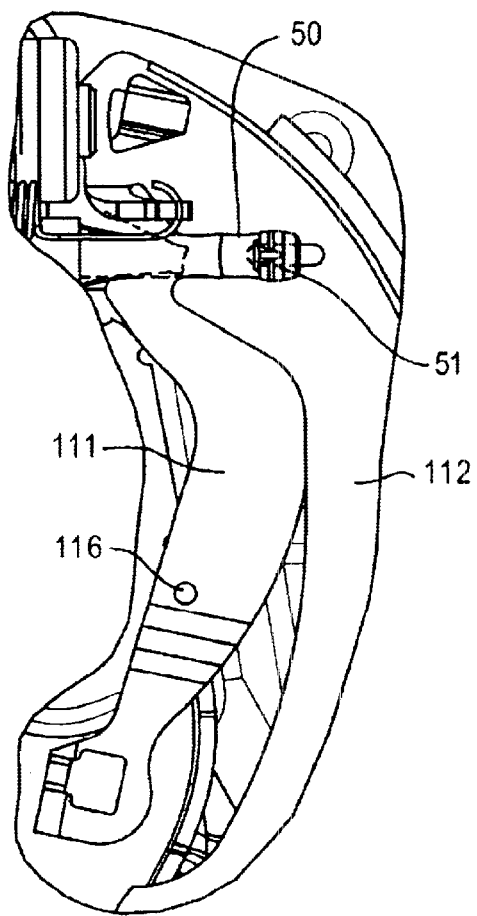
Figure 14:
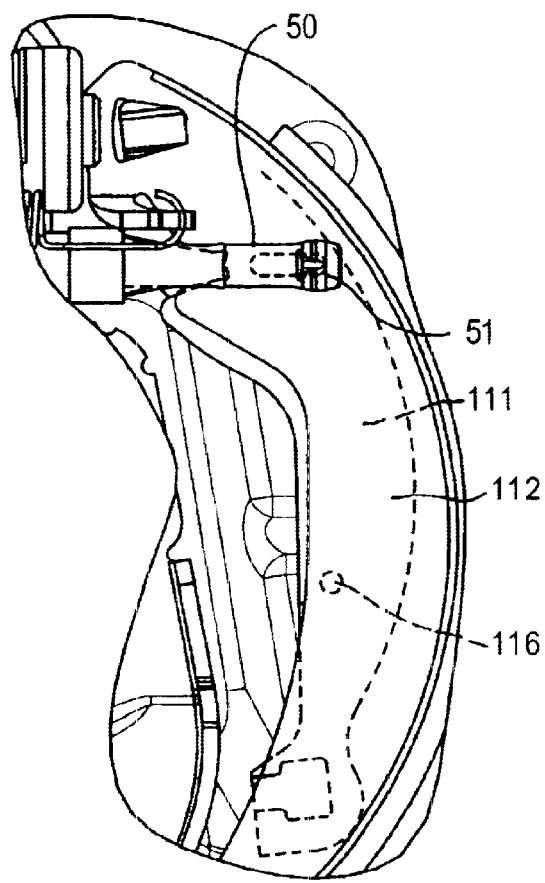

The elongate shape of the opening 53 permits the abutment 51 to shift away from the inward edge 56 as may be necessary during various stages of the operation of the brake assembly. FIGS. 12 to 14 partly illustrate a drum brake assembly of a similar kind to that shown in FIG. 1 notwithstanding that the assembly of FIGS. 12 to 14 is shown in the reverse to the assembly of FIG. 1. In view of the similarity, like reference numerals have been used to designate like parts. FIGS. 12 to 14 show brake shoe movement as follows.

FIG. 12 shows the brake assembly in the brake off or "home" position. In that figure, the abutment 51 is positioned about midway along the opening 53. It is to be noted in this figure that the projection 116 is in engagement with the inner edge 112b.

FIG. 13 shows the brake assembly in the fully applied condition and in that figure, the abutment 51 is in abutting engagement with the inward edge of the opening 53, as shown in FIG. 11. The strut is therefore restrained by the abutting engagement against release from connection with the brake shoe 52.

FIG. 14 shows the brake assembly fully retracted, and in this figure, it can be seen that the projection 116 has been disengaged from the inner edge 112b of the shoe web 112a, so that the brake shoe 112 can be shifted away from the braking surface of the drum. In FIG. 14, the abutment 51 has shifted to be positioned at or adjacent the end of the opening 53 opposite to the inward edge 56. Thus, the abutment 51 provides no resistance to the shifting movement of the brake shoe.

The invention described herein is susceptible to variations, modifications and/or additions other than those specifically described and it is to be understood that the invention includes all such variations, modifications and/or additions which fall within the spirit and scope of the above description.

What is claimed is:

1. An adjuster strut for use in a drum brake assembly, said adjuster strut having an adjustable elongate extent with first and second engagement units disposed at opposite ends thereof for engaging opposed braking members of a drum brake assembly, said first engagement unit being arranged for receipt and support within an inwardly opening slot formed in one of said braking members and including an end face for abutting engagement with the inner end wall of said slot opening, said first engagement unit further including a first channel extending rearwardly from said end face and adapted to receive therein an edge defining said slot opening; and wherein said first engagement unit further includes a second channel extending rearwardly from said end face and formed on an opposite side of said end of said strut to said first channel for receiving a further edge defining said slot opening opposite the other said edge.

2. An adjuster strut according to claim 1, including a main portion formed from tubular metal section, said first engagement unit being formed by an end portion of said main portion, said end portion being pressed to define said first channel between opposite and upstanding side regions.

3. An adjuster strut according to claim 1, said second engagement unit being arranged for receipt and support within an inwardly opening slot formed in a second of said braking members and including an end face for abutting engagement with the inner end wall of said second slot opening.

4. An adjuster strut according to claim 3, said second engagement unit further including a first channel extending rearwardly from said face, for receiving therein an edge portion defining said second slot opening.

5. An adjuster strut according to claim 1, further including a biasing unit attached thereto and which extends beyond one of said opposite ends of said strut for engaging against a side face of a said braking member.

6. An adjuster strut according to claim 5, biasing unit including a cantilever spring for extending between said strut and said inwardly extending web, said cantilever spring including attachment unit for attaching said spring to said strut.

7. An adjuster strut according to claim 1, said strut being formed with an abutment which is arranged in an installed condition of said strut adjacent an abutment provided on a said braking member, said respective abutments being arranged for engagement to prevent release of an end of said strut from engagement with the said braking member.

8. An adjuster strut according to claim 7, abutment being formed at the distal end of an elongate member fixed at one end to said strut and extending therefrom, said distal end being configured to be positioned behind said abutment of said braking member.

9. An adjuster strut according to claim 7, further including a head portion a neck portion formed at one of said opposite ends of said strut and a stepped surface at the junction between said head and neck portions, said stepped portion providing said strut abutment for arrangement adjacent said braking member abutment in said installed condition of said strut.

10. An adjuster strut according to claim 9, said head portion being bifurcated in the lengthwise direction of said strut to accept a radially inwardly extending web of said braking member.

11. A drum brake, including a rotatable drum, a support, a pair of cross-sectionally T-shaped brake shoes defining a radially inwardly depending web mounted on said support in opposed relationship for substantially radial movement into and out of engagement with a braking surface of said rotatable drum, a parking brake lever disposed adjacent the web of one of said brake shoes, an actuating unit facilitating movement of said brake shoes, and an adjuster strut having an adjustable elongate extent with first and second engagement units disposed at opposite ends thereof, said first engagement unit engaging said brake shoe and said adjacent parking brake lever, and said second engagement unit engaging the other said brake shoe, said first engagement unit being received and supported within adjacent inwardly opening slots formed in each of the web of the first of said brake shoes and said parking brake lever, and including an end face for abutting engagement at least in a radially contracted or brake off condition of said brake shoes with the inner end wall of at least one of said adjacent slots, said first engagement unit further including a first channel extending rearwardly from said end face and an edge of said one slot in which said first engagement unit abuts said end face, extends into said first channel; and wherein opposed edge portions of said parking brake lever slot taper from said inner end wall to be wider at the mouth thereof and said edge portions of said slot of said brake shoe converge from said inner end wall thereof to the mouth thereof.

12. An adjuster strut, said adjuster strut having an adjustable elongate extent with first and second engagement units disposed at opposite ends thereof for engaging opposed braking members of a drum brake assembly, said first engagement unit being arranged for receipt and support within an inwardly opening slot formed in one of said braking members and including an end face for abutting engagement with the inner end wall of said slot opening, said first engagement unit further including a first channel extending rearwardly from said end face and adapted to receive therein an edge defining said slot opening;

said second engagement unit being arranged for receipt and support within an inwardly opening slot formed in a second of said braking members and including an end face for abutting engagement with the inner end wall of said second slot opening;

said second engagement unit further including a first channel extending rearwardly from said face, for receiving therein an edge portion defining said second slot opening; and said second engagement unit further including a second channel formed on an opposite side of said end of said strut to said first channel of said second engagement unit for receiving a further edge portion defining said slot opening of said second braking member opposite the other said edge portion.

13. An adjuster strut, said adjuster strut having an adjustable elongate extent with first and second engagement units disposed at opposite ends thereof for engaging opposed braking members of a drum brake assembly, said first engagement unit being arranged for receipt and support within an inwardly opening slot formed in one of said braking members and including an end face for abutting engagement with the inner end wall of said slot opening, said first engagement unit further including a first channel extending rearwardly from said end face and adapted to receive therein an edge defining said slot opening;

a biasing unit attached thereto and which extends beyond one of said opposite ends of said strut for engaging against a side face of a said braking member;

said biasing unit including a first cantilever spring for extending between said strut and said inwardly extending web, said first cantilever spring including attachment unit for attaching said first cantilever spring to said strut; and said biasing unit including a second cantilever spring attached to said strut for extending into engagement against a side face of a radially inwardly extending web of a said braking member opposite to said side face engaged by said first cantilever spring, so that the biasing influence imposed by said respective cantilever springs is substantially equal and opposite.

14. A brake assembly, comprising:

a first braking member including an edge defining a first slot having an inner end wall;

a second braking member;

an adjuster strut having an adjustable elongate extent defining first and second ends, the adjuster strut being adapted to operate with the first braking member and the second braking member;

a first engagement unit disposed at the first end and adapted to engage the first braking member, said first engagement unit being arranged for receipt and support within the first slot of the first braking member, said first engagement unit including an end face for abutting engagement with the inner end wall of said first slot, said first engagement unit further including a first channel extending rearwardly from said end face and adapted to receive therein the edge defining said first slot opening; and wherein said first engagement unit further includes a second channel extending rearwardly from said end face and formed on an opposite side of said end of said strut to said first channel for receiving a further edge defining said slot opening opposite the other said edge.

15. A drum brake assembly according to claim 14, wherein the second braking member including an edge defining a second slot having an inner end wall, and wherein the adjuster strut includes a second engagement unit disposed at the second end and adapted to engage the second braking member, said second engagement unit being arranged for receipt and support within the second slot of the second braking member, said second engagement unit including an end face for abutting engagement with the inner end wall of said second slot, and said second engagement unit further including first and second channels extending rearwardly from said end face thereof, said second channel of said second engagement unit extending on an opposite side of said second end of said strut to said first channel and opposite edges of said second slot in which said second engagement unit abuts said end face.

16. A drum brake assembly including a rotatable drum, a support, a pair of cross-sectionally T-shaped brake shoes defining a radially inwardly depending web mounted on said support in opposed relationship for substantially radial movement into and out of engagement with a braking surface of said rotatable drum, an actuating unit facilitating movement of said brake shoes, and an adjuster strut, said adjuster strut having an adjustable elongate extent with first and second engagement units disposed at opposite ends thereof for respectively engaging said brake shoes, said first engagement unit being received and supported within an inwardly opening slot formed in the web of a first of said brake shoes and including an end face for abutting engagement at least in a radially contracted or brake off condition of said brake shoes with the inner end wall of said slot opening, said first engagement unit further including a first and second channels extending rearwardly from said end face, said second channel extending on an opposite side of said end of said strut to said first channel and said slot being arranged so that opposite edges of said slot opening extends into each of said first and second channels.

17. A drum brake assembly according to claim 16, said adjuster strut including an abutment formed at the distal end of an elongate member fixed at one end to said strut and extending such that the distal end thereof extends into position behind an abutment formed in the web of said brake shoe, whereby cooperation between said respective abutments resists release of said first engagement unit from said brake shoe.

18. A drum brake assembly according to claim 17, said brake shoe web including an opening formed therein and said brake shoe abutment being formed by an inner edge of said opening.

19. A drum brake assembly according to claim 16, the second of said brake shoes including an inwardly opening slot formed in the radially inwardly extending web thereof for receipt and support of said second engagement unit, said second engagement unit including an end face for abutting engagement at least in a radially contracted or brake off condition of said brake shoes with the inner end wall of said slot.

20. A drum brake assembly including a rotatable drum, a support, a pair of cross-sectionally T-shaped brake shoes defining a radially inwardly depending web mounted on said support in opposed relationship for substantially radial movement into and out of engagement with a braking surface of said rotatable drum, a parking brake lever disposed adjacent the web of one of said brake shoes, an actuating unit facilitating movement of said brake shoes, and an adjuster strut having an adjustable elongate extent with first and second engagement units disposed at opposite ends thereof, said first engagement unit engaging said brake shoe and said adjacent parking brake lever, and said second engagement unit engaging the other said brake shoe, said first engagement unit being received and supported within adjacent inwardly opening slots formed in each of the web of the first of said brake shoes and said parking brake lever, and including an end face for abutting engagement at least in a radially contracted or brake off condition of said brake shoes with the inner end wall of at least one of said adjacent slots, said first engagement unit further including first and second channels extending rearwardly from said end face, said second channel extending on an opposite side of said end of said strut to said first channel and opposite edges of said slot, in which said first engagement unit abuts said end face, extends into said first and second channels.

21. A drum brake assembly according to claim 20, wherein said adjacent slots include a brake shoe slot and a parking brake slot, and wherein the brake shoe slot has a greater lengthwise extent than said parking brake lever slot, such that said end face of said first engagement unit engages only the inner end wall of said parking brake lever slot in said brake off condition.

22. A drum brake assembly according to claim 20, said adjuster strut including an abutment formed at the distal end of an elongate member fixed at one end to said strut and extending such that the distal end thereof extends into position behind an abutment formed on said parking brake lever whereby cooperation between said respective abutments resists release of said first engagement unit from said parking brake lever.

23. A drum brake assembly according to claim 20, wherein said edge portion of said parking brake lever slot extends into said channel and said edge portion of said brake shoe slot engages said first engagement unit adjacent said channel.

24. A drum brake assembly according to claim 20, the second of said brake shoes including an inwardly opening slot formed in the radially inwardly extending web thereof for receipt and support of said second engagement unit, said second engagement unit including an end face for abutting engagement at least in a radially contracted or brake off condition of said brake shoes with the inner end wall of said slot.

25. A drum brake assembly according to claim 24, said second engagement unit extending from said end face about either side of said web of said second brake shoe.

26. A drum brake assembly according to claim 24, said slot of said second brake shoe including at least one abutment for cooperating with an abutment of said second engagement unit, whereby cooperation between said respective abutments resists release of said second engagement unit from said slot.

27. A drum brake assembly according to claim 26, said second engagement unit including a head and neck portion and a stepped surface at the junction between said head and neck portions, and said abutment of said second brake shoe being provided by a lip depending from said slot and said stepped surface being located behind said lip.

* * * * *